E. TAYLOR.
COVERING ATTACHMENT FOR SEED PLANTERS.
APPLICATION FILED SEPT. 21, 1914.
1,179,579.
Patented Apr. 18, 1916.
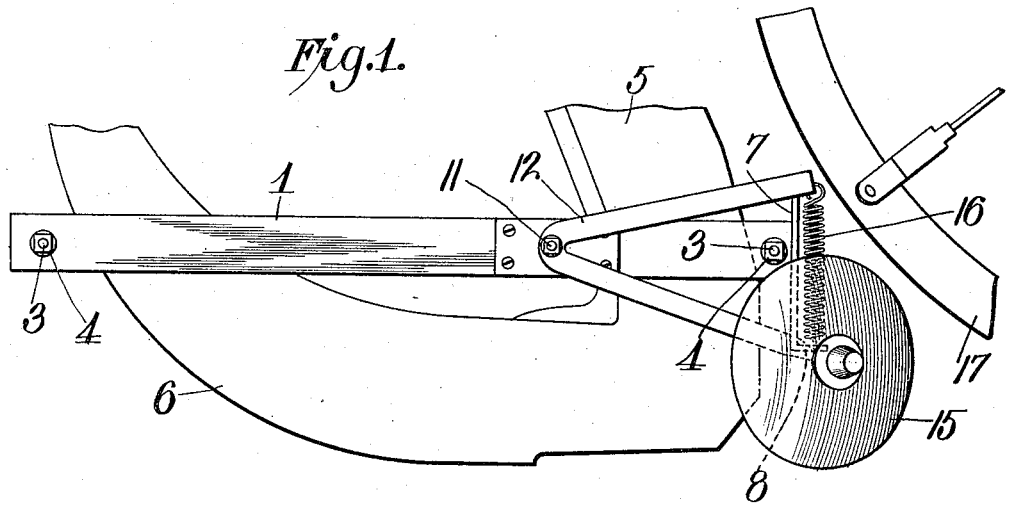
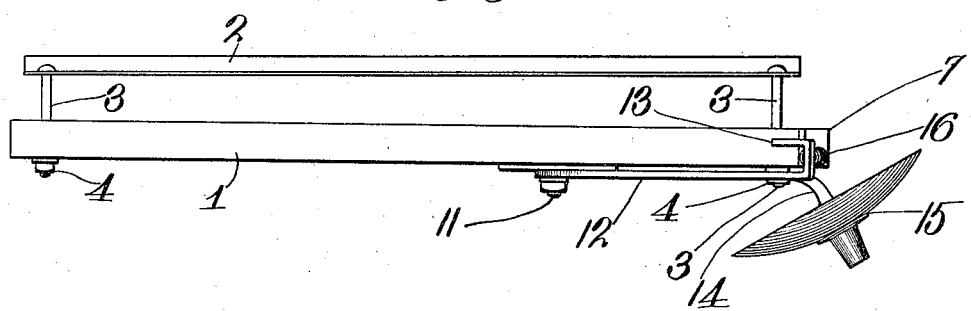
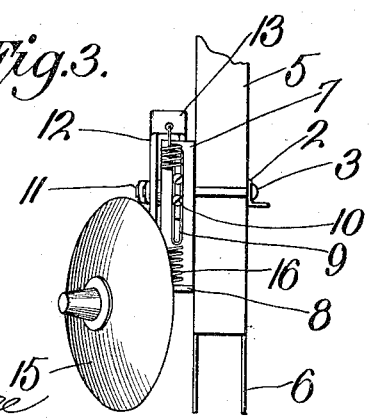
WITNESSES:
INVENTOR
Edwin Taylor
BY
ATTORNEY

UNITED STATES PATENT OFFICE.

EDWIN TAYLOR, OF EDWARDSVILLE, KANSAS.

COVERING ATTACHMENT FOR SEED-PLANTERS.

1,179,579.

Specification of Letters Patent. Patented Apr. 18, 1916.

Application filed September 21, 1914. Serial No. 862,714.

*To all whom it may concern:*

Be it known that I, EDWIN TAYLOR, a citizen of the United States, residing at Edwardsville, in the county of Wyandotte and State of Kansas, have invented certain new and useful Improvements in Covering Attachments for Seed-Planters, of which the following is a specification.

This invention relates to covering attachments for seed planters.

Heretofore covering attachments for seed planters have been patented—such for instance as the patent for "Attachment for seed planters" issued to me Oct. 25, 1910, No. 973,824—for use on a particular seed planter, which devices have proven impractical from a commercial standpoint owing to the fact that each has been formed and proportioned for attachment to a particular type of planter and could not be used upon planters having seed conveying legs of materially different shapes and sizes. In other words—heretofore attachments of the character under consideration with which I am familiar have been secured only to the leg or some other one part of the planter and hence had to be formed and proportioned as explained for use upon such leg or part.

I have found that a practically universal attachment and hence a commercially successful attachment can be produced by providing means which can be clamped at two points to fixed parts of a planter or drill but that such two-point clamp must be of considerable length in order that it shall accommodate structures of materially different forms and sizes, and my object is to produce an attachment embodying a long two-point clamp which can be secured firmly to the hollow leg of a planter or drill and to the runner of the planter or some other stationary part of the drill as the case may be, a further object being to produce an attachment of this character of simple strong, durable and cheap construction which can be readily applied to or removed from any of the approved types of planters or drills on the market.

With these objects in view the invention consists in certain novel and peculiar features of construction and organization as hereinafter described and claimed; and in order that it may be fully understood reference is to be had to the accompanying drawing, in which—

Figure 1, is a side view of a leg and runner of a corn planter equipped with a detachable and adjustable covering attachment embodying my invention. Fig. 2, is a plan view of the attachment. Fig. 3, is a rear view of the attachment and a leg and runner of the planter.

In carrying out my invention in its most simple, practical and cheapest form, I use a supporting frame or clamp consisting of two bars which stand in parallel or slightly angular relation, and at least one of them is of wood or other compressible material so that it may obtain a strong frictional grip on the parts against which it is clamped. The bars referred to are identified by reference characters 1 and 2 and they are connected at their extremities by bolts 3 engaged by clamping nuts 4. Secured in a substantially vertical position to the rear end of bar 1 which on a planter will preferably be of wood, and located at the outside of the leg 5 and runner 6 of the planter is a bracket 7 provided at its lower end with an outturned foot 8 in a plane considerably lower than the bars, and said bracket is provided with a vertical slot 9 through which extend into the rear end of bar 1, two or more securing devices, such as screws 10, the arrangement being such as to provide for vertical adjustment of the bracket.

Pivoted at 11 at the outer side of the outer bar is a V-shaped swinging frame 12 adapted for movement in a vertical plane, the rear end of the upper arm of said frame terminating in a hook 13 adapted to impinge upon the upper end of bracket 7, whereby the latter is utilized as a means for limiting downward swinging movement of said frame. The lower arm of said frame terminates in an arm 14 which extends outwardly and rearwardly and journaled thereon in the usual or any preferred manner is a disk 15 for turning soil inwardly and filling the furrow produced by the runner 6 or other furrow-opening device of the planter or drill, and for holding the swinging frame pressed yieldingly downward with the hook terminal of its upper arm upon the bracket, is a retractile spring 16 secured at its lower end to the foot 8 and at its upper end to the said hook terminal of the swinging frame.

To secure the attachment to the corn planter as shown, one of the bolts 3 is withdrawn and the attachment slipped upon the leg and runner of the planter at a suitable point after which the bolt is replaced and nuts 4 are turned to clamp the bars with such friction upon the leg and runner that they cannot slip thereon, and in this connection it is to be understood that the bolts will extend loosely through said bars so that the latter may assume such relative position that they shall be clamped firmly upon both the leg and runner without regard to whether the same are of equal width or thickness. If it is found when the bars are thus clamped at the most desirable points, that the disk is too low or too high with relation to the bottom of the runner, the bracket 7 will be raised or lowered by sliding it upward or downward on the securing screws, after which the latter are screwed home to firmly secure the bracket at the proper elevation. The appliance is then ready for use and as it is drawn across the field the disk will turn inward sufficient soil to properly close the furrow and cover the seed therein.

When used in connection with a planter the ordinary covering wheel 17 which follows in the wake of the runner will pack the covering soil in place. When used upon a drill the rear portions of the bars will be clamped upon the leg and the front portions will preferably be clamped to the customary draw bar of said leg, and in such use the clamping bars will usually extend upward and forward at a considerable angle to accommodate the position of the draw bar.

In operation the covering disk will be permitted by the spring to ride over weeds, sticks and other obstructions, the spring instantly returning the disk to operative position after passing over an obstruction, so that no material part or parts of the furrow shall be left uncovered, it being noted that the vertical adjustment of the bracket enables the operator to control the depth at which the disk coverer operates.

From the above description it will be apparent that the attachment can be made practically as solid and dependable as the integral parts of the planter or drill and can not work loose under the relatively light strain imposed upon it through the operation of the disk, it being apparent that the invention is susceptible of modification in minor particulars without departing from the principle of construction involved.

I claim:—

1. A covering attachment for seed planters, comprising a frame for frictional engagement with the seed-conveying leg and another fixed point of the planter, a bracket secured to the rear end of the frame, a substantially V-shaped swinging frame pivoted to the first-named frame and comprising an upper arm and a lower arm, a device carried by the lower arm of the swinging frame for turning soil into the furrow into which drops the seed from the seed leg, and a spring yieldingly holding the upper arm of said frame down upon said bracket.

2. A covering attachment for seed planters, comprising a pair of bars for engaging opposite sides of the seed dropping legs and another point of the seed planter, connections between said bars rearward of said leg and forward of said other point, a vertically adjustable bracket secured to the rear end of one of the bars, a frame pivoted to one of the bars for movement in a vertical plane, a spring for depressing said frame until its downward movement is limited by said adjustable bar, and a disk journaled on said frame and set at an angle thereto to turn the soil into a furrow into which seed has been dropped.

In testimony whereof, I affix my signature, in the presence of two witnesses.

EDWIN TAYLOR.

Witnesses:
BEN F. SHAMBAUGH,
G. Y. THORPE.

Copies of this patent may be obtained for five cents each, by addressing the "Commissioner of Patents, Washington, D. C."